March 19, 1935. R. A. CARLSON 1,994,463
AUTOMATIC FEED CONTROL MECHANISM
Filed Feb. 15, 1929 2 Sheets-Sheet 1
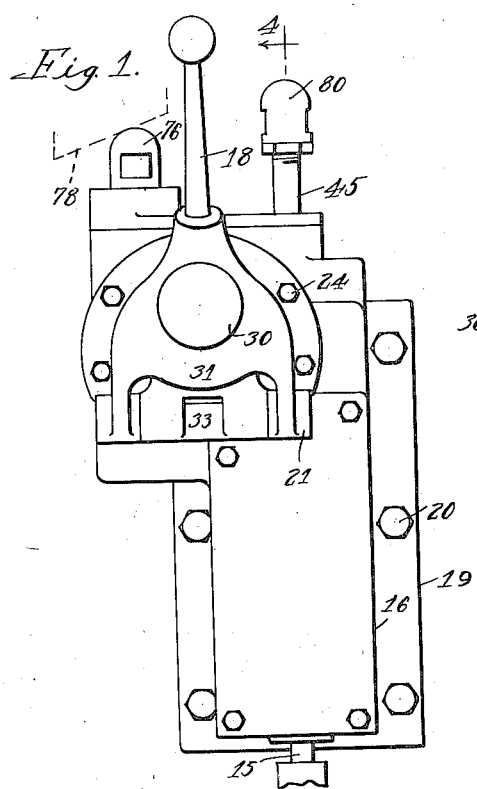
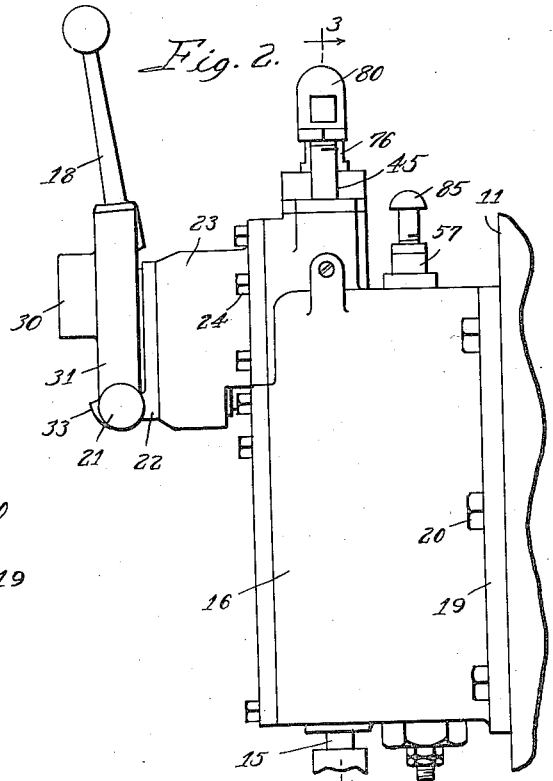
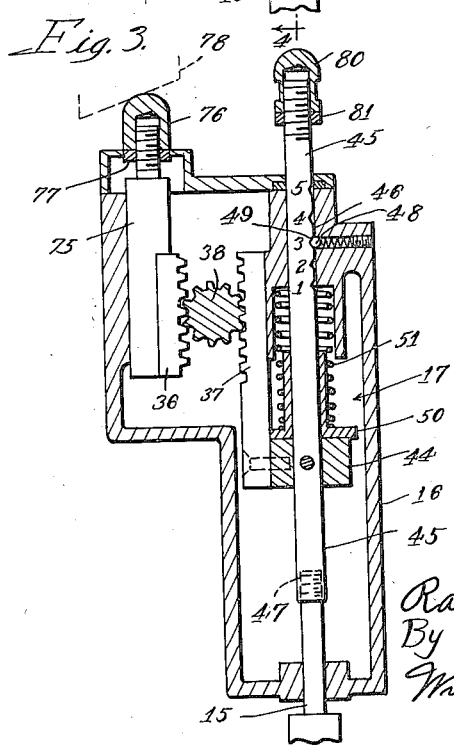
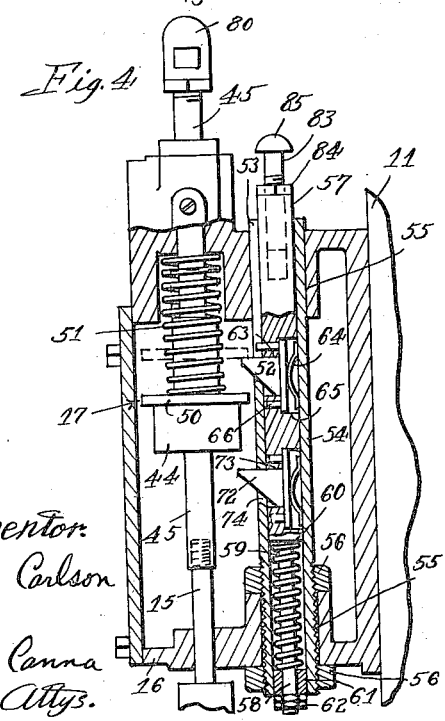
Inventor:
Raymond A. Carlson
By
Wilson & McCanna
Attys.

March 19, 1935.   R. A. CARLSON   1,994,463
AUTOMATIC FEED CONTROL MECHANISM
Filed Feb. 15, 1929   2 Sheets-Sheet 2
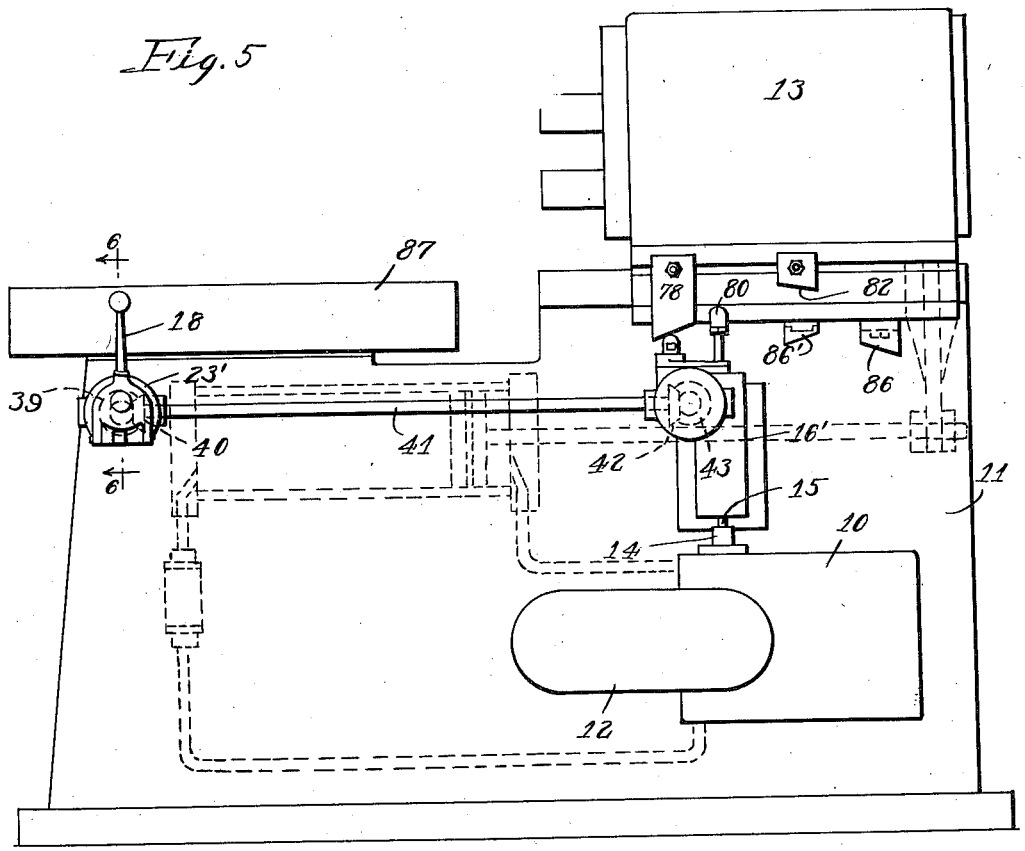
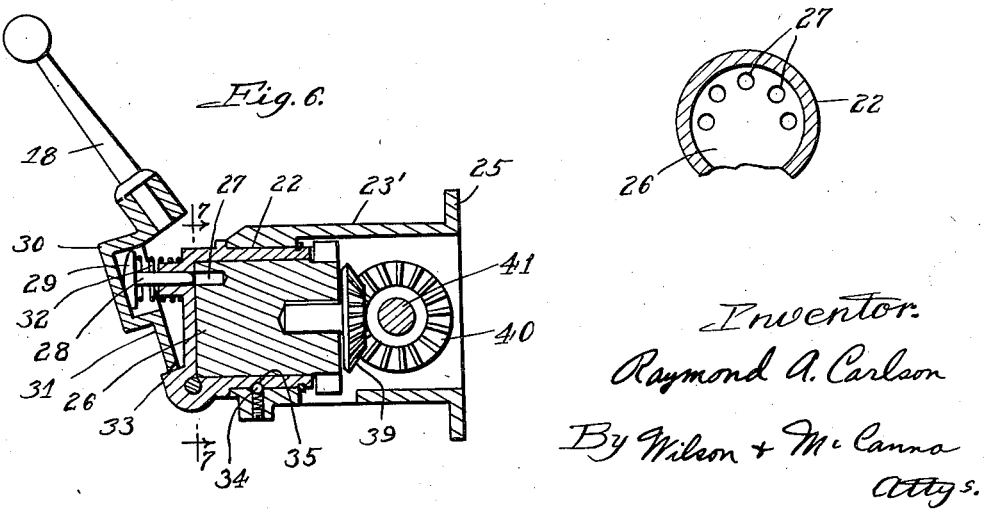
Inventor:
Raymond A. Carlson
By Wilson & McCanna
Attys.

Patented Mar. 19, 1935

1,994,463

UNITED STATES PATENT OFFICE 1,994,463

AUTOMATIC FEED CONTROL MECHANISM

Raymond A. Carlson, Rockford, Ill., assignor, by mesne assignments, to Rockford Drilling Machine Co., Rockford, Ill., a corporation of Illinois Application February 15, 1929, Serial No. 340,208

25 Claims. (Cl. 60—52)

This invention relates to an automotic feed control mechanism for hydraulically fed machine tools, whether of the vertical or of the horizontal type, for the fully automatic or semiautomatic control of the cycle of quick approach, feed, quick return, and stop, or a variation of this cycle consisting of quick approach and feed in one direction, feed in the opposite direction, quick return, and stop.

The principal object of my invention is to provide a simple, compact, and economical form of control mechanism of the character referred to adaptable for application as a control unit to practically any kind of machine tool, wherever a reciprocating tool carriage or work carriage is employed, as for example, in drilling, boring, counter-boring, reaming, milling, facing, chamfering, grinding or tapping.

One of the principal features of the unit of my invention consists in the provision of a load and fire trip mechansm therein arranged to be loaded by manual operation of a control lever in the starting of the carriage at the beginning of the cycle, when the carriage is thrown into quick approach, and arranged to be subsequently tripped automatically at a predetermined point or points in the travel of the carriage, there being only one trip in the case where there is no feed in reverse, in which case the carriage is thrown from forward feed directly into quick return, and there being two trips of the mechanism where there is a feed in both directions, the one trip changing from forward feed to reverse feed, and the other trip changing from reverse feed to quick return. With this sort of a unit, it will be obvious that dogs may be provided on the carriage to cooperate with plungers on the unit to take care of the tripping automatically, in much the same manner as speed changes were accomplished heretofore with the conventional form of feed box using change speed gearing. The application of the unit and its adapatability to suit requirements is, therefore, just as universal, and set-ups of the machine can be made in substantially the same way so that there is no occasion for mistakes being made and no difficulty in familiarizing an operator with the characteristics of a machine equipped with this sort of control.

Still another feature of this unit is the fact that the manually operable part of the unit may be built into one assembly with the automatically operated part, or may be disposed at a remote point with respect thereto so as to be more convenient for manipulation by the operator at his usual station. This makes the unit practically universally applicable, it being just as easily applied to a vertical type machine, where the automatically operated part of the unit may have to be mounted at an appreciable elevation on a column possibly not within easy reach of the operator, as on a horizontal type machine, although even in an installation on a horizontal type machine there are frequently instances where it is desired to have the manually operable control lever at one end of the machine where the operator is usually stationed, and the automatically operated part of the unit at the other end of the machine, such a machine being hereinafter described.

The invention is fully described in the following specification, in which reference is made to the accompanying drawings, wherein:—

Figures 1 and 2 are respectively a front and side view of a unit made in accordance with my invention;

Figs. 3 and 4 are vertical cross-sections through the unit in planes at right angles to one another, Fig. 3 being taken on the line 3—3 of Fig. 2, and Fig. 4 on the line 4—4 of Fig. 1;

Fig. 5 is a front view of a multiple spindle, horizontal drilling, reaming or boring machine having a modified form of my unit shown applied thereto, the unit being modified to the extent of having the hand control lever remote from the rest of the unit for better convenience in the manipulation thereof by the operator stationed at one end of the machine;

Fig. 6 is a vertical section through the hand control lever of the unit taken on the line 6—6 of Fig. 1, and Fig. 7 is a sectional detail taken on the line 7—7 of Fig. 6.

The same or similar reference numerals are applied to corresponding parts throughout the views.

In the application of the well known "Oilgear" drives to machine tools, there have been various forms of controls proposed, and so far as I am aware, most of these have been of a more or less complicated and expensive construction and, besides being more or less unsatisfactory from the standpoint of requiring attention repeatedly, were objectionable from the standpoint that they did not lend themselves to as wide application as could be desired. In the present "Oilgear" drive, a pump 10 (see Fig. 5) of the type disclosed in Ferris Patents #1,753,562 and #1,854,127 is mounted on one side of the base 11 of the machine, or at any other convenient point, and is driven through connections, represented generally at 12, by an electric motor set within the base or at any other convenient place, this pump being connected by pipes, as appears in dotted lines, with the opposite ends of a hydraulic cylinder in which a ram connected with the movable carriage 13 is arranged to operate. This general description applies to most hydraulically operated machine tools, there being slight variations in different machines, as for example, in some machines the cylinder is mounted on the movable carriage and the ram is fixed. Essentially, however, all of these machines involve the use of the pump connected with opposite ends of the cylinder, and the delivery of the pump is arranged to be controlled by means of a valve or valves to provide for rapid traverse or feed movements of the carriage. The particular pump herein illustrated is covered in the Ferris patents mentioned above and is known as the "Oilgear" Q S pump, and the valve 14, which in this case is built into the pump and a portion of whose casing is shown as projecting from the casing of the pump, has the reciprocable stem or control member 15 thereof arranged by shifting thereof to different positions in sequence to provide for a cycle either in the form of quick approach, feed, and quick return, or in the form of quick approach, feed, reverse feed, and quick return. It should be understood, however, that no limitation is to be regarded as imposed upon the application of my invention by reason of reference to this particular style of pump and valve.

Referring now more particularly to Figs. 1 to 4, and incidentally to Figs. 6 and 7, the unit of my invention when built in one assembly, has the casing 16 for the load and fire trip mechanism 17, connected with the valve stem 15, providing a support for the hand control lever 18, said casing being suitably flanged, as represented at 19, to permit bolting the same onto the side of the machine, as shown at 20. Reference has been made to other installations where the hand control lever has a separate mounting remote from the casing. The lever 18 in either form of installation has trunnions received in bearings 21 provided on a sleeve 22 rotatably received in a bearing in the outer end of a housing 23 fastened, as by means of bolts 24, onto the casing 16. The housing 23' appearing in Fig. 6 is the equivalent of the housing 23, and is used where the lever 18 is mounted remotely with reference to the casing 16', the said housing in that case being elongated and flanged, as shown at 25, to permit bolting the same onto the side of the machine. In both installations a drum 26 is rotatably received within the sleeve 22, and has a plurality of parallel holes 27 provided in circularly spaced relation in the outer end thereof for detachable engagement therein of a latch 28. The latch 28 slides in a hole provided therefor in the sleeve 22, and has the mushroom head 29 thereof engaging in a socket 30 provided in the plate 31 which provides the mounting for the lever 18 and which is suitably cast to the form shown. A compression spring 32 beneath the head 29 is arranged normally to urge the latch 28 outwardly away fom the drum 26, and at the same time, throw the lever 18 to the retracted position shown in Fig. 6, in which position the lower edge of the plate bears against a stop 33 provided on the sleeve 22. The purpose of this construction is to permit the drum 26 to be turned by hand by moving the lever 18 forwardly to engage the latch 28 in one of the holes 27, and then swinging the lever sideways in whichever direction it is desired to turn the drum. Then, after the drum has been turned and the lever 18 is released, the spring 32 automatically moves it to retracted position so that thereafter the drum 26 may turn independently of any movement of the lever. There are five holes 27 corresponding to the five different positions which the drum 26 is arranged to occupy, as will presently appear. A ball detent 34 is spring pressed into engagement with the sleeve 22, and is arranged to drop into any one of five recesses 35 provided therefor in the periphery of the sleeve. These recesses are spaced the same angular distance as the holes 27.

The drum 26 has a gearing connection with two racks 36 and 37, either directly through a pinion 38 mounted on and turning with the drum 26, where the unit has the lever 18 mounted directly on the housing 16, as shown in Fig. 3, or through intermediate miter gears 39 and 40, shaft 41 and miter gears 42 and 43, where the lever 18 is mounted remotely with reference to the casing 16', as shown in Fig. 5, in which case the miter gear 43 is arranged to turn a pinion similar to the pinion 38 previously referred to. The fact that both types of units will operate in the same way should be apparent from the description just given; movement of the lever 18 laterally communicates rotation to the pinion 38 in either case. The rack 37 is fixed to a ring 44 mounted on a plunger 45 slidably received in a hole 46 provided in the casing 16. The lower end of the plunger 45 has a hole 47 drilled therein and tapped for threaded reception of the upper end of the valve stem 15. A ball detent 48 is spring pressed toward engagement into either one of five notches 49 provided on one side of the plunger 45, whereby to hold the plunger yieldingly in any one of five different positions to which the same has been moved and accordingly keep the valve stem 15 in any one of its five positions of adjustment. A flanged collar 50, constituting the striker of the load and fire mechanism 17 previously referred to, is slidably mounted on the plunger 45 and has a coiled compression spring 51 bearing against the top of the flange thereof tending normally to urge the same downwardly toward the ring 44. The collar 50 is arranged to be held in a raised cocked position, represented in dotted lines in Fig. 4, by means of a latch 52 projecting under the edge of the flange of said collar from a slot 53 provided in a sleeve 54. The latter is mounted in holes 55 provided in the top and bottom walls of the casing 16 and is arranged to be adjustable endwise in said holes and held in adjusted position by the relative adjustment and tightening of nuts 56 threaded on the lower end of said sleeve above and below the bottom wall of the casing in the manner shown. A plunger 57, slidaby mounted in the sleeve 54, has a reduced lower end portion 58 about which a coiled compression spring 59 fits within the sleeve 54. The spring acts between the annular shoulder 60 on the plunger 57 and a plug 61, having a drive fit in the lower end of the sleeve 54 and tends normally to urge the plunger 57 upwardly. Nuts 62, threaded on the lower end of the reduced portion 58 of the plunger 57, serve to limit the upward movement of the plunger. The spring 59 is, of course, heavier than the spring 51 in order to hold the collar 50 in the cocked position against the action of the spring 51 by means of the latch 52. The latter is slidably mounted in a slot 63 provided therefor in the plunger 57 and is normally held extended by means of a leaf spring 64 disposed in a recess 65 cut into the side of the plunger 57 behind the slot 63. The pins 66 on the latch 52 slide in small holes drilled into the plunger 57 parallel to the slot 63, and serve to guide the latch for straight line motion. Another latch 72, similar to the latch 52, may or may not be provided below the latter projecting from a slot 73 in the plunger 57 through a slot 74 in the wall of the sleeve 54.

Now, the rack 36 is provided on a plunger 75, the upper end of which has a knob 76 adjustably mounted thereon and arranged to be locked in adjusted position by a nut 77. The knob 76 has a rounded top and is arranged to be engaged by a dog on the carriage of the machine in connection with which the unit is used, such as the dog 78 on the carriage 13 shown in Fig. 5. Another knob 80 is adjustably mounted on the upper end of the plunger 45 and arranged to be held in adjusted position by means of a lock nut 81, and this knob likewise has the top thereof rounded and arranged for engagement by another dog on the carriage of the machine, such as the dog 82 appearing in Fig. 5. The plunger 57, on the other hand, has a screw 83 adjustably mounted in the upper end thereof and arranged to be set in adjusted position by means of a lock nut 84, and the knob 85 on this screw is arranged for engagement by either one of two dogs on the carriage of the machine, such as the dogs 86 and 86' shown in Fig. 5.

In the operation of my control unit, assuming that the carriage is at a standstill at the end of a cycle, the operator grasps the lever 18, shoves it forward to engage the latch 28 into the middle hole 27 and swings the lever in a counter-clockwise direction, that is, to the left as the parts are seen in Figs. 1, 3 and 5. In this movement the pinion 38 raises the rack 37 and lowers the rack 36, both to their limit positions. The plunger 45 in the raising of the rack 37 is correspondingly raised and the valve stem 15 is brought to its uppermost position in which the detent 48 drops into the lowermost notch 49 on the plunger 45, the same being designated No. 1. In this position of the valve stem, there is a full delivery of oil from the pump 10 for the quick approach of the carriage 13 toward the work on the table 87. In the raising of the plunger 45, the ring 44 raises the collar 50 to the position shown in dotted lines in Fig. 4, where it is held by the latch 52. The quick approach of the carriage 13 continues until the dog 82 comes into engagement with the knob 80 of the plunger 45 and forces it down enough to cause the ball detent 48 to drop into notch No. 2. This movement of the plunger 45 is, of course, communicated to the valve stem 15, and the result is that the pump's delivery is changed from quick approach to feed. This movement of the plunger 45 has, of course, left the position of the collar 50 unchanged. The carriage continues on its feed movement until the dog 86 encounters the knob 85 and forces the plunger 57 downwardly against the action of its spring 59 to an extent sufficient for the latch 52 to be retracted enough to allow the collar 50 to pass the same. The moment the collar 50 is released by the latch 52, it is thrown down under action of the spring 51 into engagement with the ring 44 with enough force to move the plunger 45 from the feed position past the neutral position to reverse feed position, in which the ball detent 48 drops into the notch No. 4. A definite limit is placed on the movement of the plunger 45 by the engagement of the ring 44 with the other latch 72, the spring 51 still remaining under appreciable load for a purpose which will presently appear. In this new position of the plunger 45, the valve stem 15 has, of course, been shifted to change the pump's delivery from forward feed to reverse feed. A reverse feed is sometimes desired, as for example, for boring or back facing, but in many cases there is no need for such a feed, and the latch 72 is accordingly omitted, so that when the dog 86 engages the knob 85 and brings about the release of the collar 50, as above described, the collar 50 is arranged to move the plunger 45 all the way from feed position to quick return, that is, from notch No. 2 to notch No. 5. However, I have preferred to illustrate the additional latch 72 in order to make it clear that the invention is not limited to use with machines having only a forward feed and no reverse feed. Assuming then, that the carriage 79 is traveling back on the reverse feed, the next thing that occurs is the engagement of the dog 86' with the knob 85 to force the plunger 57 down again against the action of its spring 59 just enough to have the latch 72 release the ring 44 so that the collar 50 is free to move again under the action of its spring 51. The collar 50 is thus arranged by pressure on the ring 44 to move the plunger 45 downwardly from reverse feed position to quick return, that is, from notch No. 4 to notch No. 5. Thus, the carriage 13 is accelerated for its return to the starting point. The dog 86' must be of a pivoted form active only in the return movement of the carriage 13. That form of dog is shown and is well known in this art. The quick return of the carriage continues until the dog 78 comes into engagement with the knob 76 on the plunger 75 and forces the latter downwardly sufficient to raise the plunger 45 from the quick return position to the neutral position, that is, from notch No. 5 to notch No. 3. The carriage 13 is thus brought to a standstill at the completion of the cycle of quick approach, feed, reverse feed and quick return.

The operation as just described, it will be observed, is fully automatic from the moment the carriage is started by manipulation of the hand lever to the time it is automatically brought to a standstill at the end of a cycle. It might occur, however, that when the carriage is in motion the operator might either want to bring it to a halt or cause it to return to the starting point. The unit is constructed with that in mind. Thus, let us assume that the operator wants to stop the carriage during its feed movement; in that case he simply grasps the lever 18, shoves it forward to engage the latch 28 in the hole 27 registering therewith, and moves the lever to the right, that is, in a clockwise direction, sufficient to move the plunger 45 from feed position to neutral position, namely, from notch No. 2 to notch No. 3. Similarly, if it is desired to return the carriage to the starting point, the lever may be moved still farther to shift the plunger 45 all the way to quick return position, namely, to notch No. 5.

It is believed that the foregoing description conveys a clear understanding of my invention and of its various objects and advantages. The appended claims have been drawn with a view to affording a degree of protection commensurate with the novelty presented.

I claim:

1. In a trip mechanism of the character described adapted for use with a reciprocable machine tool part, the combination with a valve member arranged to be shifted to different positions, of a spring-actuated plunger arranged to be shifted with the valve member or to shift the latter under spring action, a manually operable member having connection with the valve member and plunger arranged at the beginning of a cycle to shift the valve member from neutral position and at the same time shift the plunger to a certain position, a latch for releasably holding the spring-actuated plunger in set position, and a pair of dog-actuated plungers, the one dog-actuated plunger being associated with said valve member and the other dog-actuated plunger being associated with the latch, the first mentioned dog-actuated plunger being arranged to be automatically operated in the forward movement of the part to shift the valve member a predetermined amount for a speed change, and the last mentioned dog-actuated plunger being arranged at the end of the forward movement to be automatically operated to trip the latch member whereby to move the valve under spring action of the first plunger past neutral to reverse position.

2. In a mechanism of the character described, the combination with a single control member arranged to be shifted in either direction to control the speed and direction of travel of the carriage of a machine tool in rapid traverse and feed movements, of a control casing, a manually operable control lever provided in connection with said casing, a plunger mounted in said casing and projecting therefrom, connections between the plunger and lever and also with the control member whereby movement of the control lever communicates movement to the control member and shifts the plunger to a predetermined position, means for operating said plunger in the movement of the carriage after the manual operation of said lever whereby to shift the control member successively in a predetermined manner for forward movements, means for shifting said plunger at the end of the forward movement past neutral position to reverse position, to cause return movement of the carriage, and another plunger projecting from said casing and mechanically connected with the control member arranged to be shifted whenever the control member is shifted during the cycle, said plunger being arranged to be operated in the movement of the carriage at the end of the cycle to automatically shift the control member back to neutral position.

3. A structure as set forth in claim 1 wherein the spring-actuated plunger is slidably mounted on the last mentioned dog-actuated plunger and the latter is arranged to be shifted independently of the former when the former is held in set position.

4. A structure as set forth in claim 1 wherein the spring-actuated plunger is slidably mounted with reference to the last mentioned dog-actuated plunger and the latter is arranged to be shifted independently of the former when the former is held in set position.

5. A structure as set forth in claim 1 including a third dog-actuated plunger mechanically connected with the valve member so as to be shifted with it to different positions during the cycle, said plunger being arranged to be automatically operated in the movement of the machine tool part at the end of the cycle to shift the valve member back to neutral position.

6. A structure as set forth in claim 1 including in combination with the last mentioned dog-actuated plunger a third dog-actuated plunger, and means providing a reversing mechanical connection between said plungers whereby in the movement of the one plunger in one direction the other is automatically moved in the opposite direction, the third dog-actuated plunger being arranged in the movement of the machine tool part at the end of the cycle to be automatically operated to shift the valve member back to neutral position.

7. A control unit for a hydraulically operated machine tool having a reciprocable carriage, said unit comprising a casing, a pair of plungers mounted for reciprocation in spaced parallel relation in said casing, a pinion therebetween, opposed racks meshing with said pinion associated with said plungers, means for turning said pinion manually in the manual adjustment of said plungers, said pinion being also arranged to turn to transmit movement from one plunger to the other, the one plunger being arranged to be connected with a valve or the equivalent control element to be operated, a striker slidably mounted in the casing relative to an abutment provided on one of the plungers, spring means normally urging the striker toward said abutment, a latch arranged to hold the striker in a cocked position, said striker being arranged to be moved to cocked position by said abutment when said plunger is moved by hand to a certain position from a neutral position, and means for tripping said latch.

8. A control unit for a hydraulically operated machine tool having a reciprocable carriage, said unit comprising a casing, a pair of plungers mounted for reciprocation in spaced parallel relation in said casing, a pinion therebetween, opposed racks meshing with said pinion associated with said plungers, means for turning said pinion manually in the manual adjustment of said plungers, said pinion being also arranged to turn to transmit movement from one plunger to the other, the one plunger being arranged to be connected with a valve or the equivalent control element to be operated, a striker slidably mounted in the casing relative to an abutment provided on one of the plungers, spring means normally urging the striker toward said abutment, latch means including a catch arranged to hold the striker in a cocked position, said striker being arranged to be moved to cocked position by said abutment when said plunger is moved by hand to a certain position from a neutral position, said latch means including another catch arranged to limit the movement of the parts when the first catch is released, and means for tripping said latch means.

9. In a control unit of the character described, the combination with a reciprocable machine tool carriage having dogs thereon, of a stationary casing, a pair of plungers mounted for reciprocation in and extending from said casing for depression by the dogs and disposed substantially parallel to one another in a certain plane, a pinion disposed between the plungers, a pair of racks meshing with the pinion on opposite sides thereof, one arranged to move the one plunger and the other arranged to move the other plunger, a control member, an operating connection between one of said plungers and said control member, the depression of the one plunger producing movement of the control member in one direction, and the depression of the other plunger producing return movement of said control member, and manually operable means mounted on the outside of the casing having a detachable operating connection with said pinion for turning the same, said connection permitting the turning of the pinion independently of the manually operable means by movement of one of one of said plungers.

10. In a control unit of the character described, the combination with a reciprocable machine tool carriage having dogs thereon, of a stationary casing, a pair of plungers mounted for reciprocation in and extending from said casing for depression by the dogs and disposed substantially parallel to one another in a certain plane, a pinion disposed between the plungers, a pair of racks meshing with the pinion on opposite sides thereof, one arranged to move the one plunger and the other arranged to move the other plunger, a control member, an operating connection between one of said plungers and said control member, the depression of the one plunger producing movement of the control member in one direction, and the depression of the other plunger producing return movement of said control member, a drum in the casing turning with the pinion, a sleeve rotatably received in a bearing in the wall of the casing and rotatably receiving one end of said drum, a manually operable lever pivotally mounted on the sleeve on the outside of the casing to swing from an operative position to an inoperative position, the same normally occupying an inoperative position, and means on the sleeve arranged in the movement of the lever to operative position to detachably lock the sleeve and drum together whereby to permit turning of the latter in the manual turning of the sleeve.

11. In a control unit of the character described, the combination with a reciprocable machine tool carriage having dogs thereon, of a stationary casing, a pair of plungers mounted for reciprocation in and extending from said casing for depression by the dogs and disposed substantially parallel to one another in a certain plane, a pinion disposed between the plungers, a pair of racks meshing with the pinion on opposite sides thereof, one arranged to move the one plunger and the other arranged to move the other plunger, a control member, an operating connection between one of said plungers and said control member, the depression of the one plunger producing movement of the control member in one direction, and the depression of the other plunger producing return movement of said control member, a sleeve slidably mounted on one of said plungers, spring means normally urging the same in one direction to move the plunger in that direction, means for releasably locking said sleeve in a cocked position, and means for releasing the last mentioned means.

12. A control unit as set forth in claim 11 wherein the last mentioned means comprises a plunger mounted for reciprocation in and extending from said casing in a plane parallel with the plane of the other two plungers.

13. In a trip mechanism of the character described adapted for use with a reciprocable machine tool part, the combination with a valve member arranged to be shifted to different positions, of a spring-actuated plunger arranged to be shifted with the valve member or to shift the latter under spring action, a manually operable member having connection with the valve member and plunger arranged at the beginning of a cycle to shift the valve member from neutral position and at the same time shift the plunger to a certain position, a latch for releasably holding the spring-actuated plunger in set position, a pair of dog-actuated plungers, the one dog- actuated plunger being associated with said valve member and the other dog-actuated plunger being associated with the latch, the first mentioned dog-actuated plunger being arranged to be automatically operated in the forward movement of the part to shift the valve member a predetermined amount for a speed change, and the last mentioned dog-actuated plunger being arranged at the end of the forward movement to be automatically operated to trip the latch member whereby to move the valve under spring action of the first plunger past neutral to reverse position, and means operated automatically at the end of the return movement to shift the valve member to neutral position.

14. In a mechanism of the character described, the combination with a single control member arranged to be moved in either direction to control the speed and direction of travel of the carriage of a machine tool in rapid traverse and feed movements, of a control casing, a manually operable control lever extending from said casing, a plunger mounted in said casing and projecting therefrom, connections between the plunger and lever and also with the control member whereby movement of the control lever communicates movement to the control member and moves the plunger, means for operating said plunger in the movement of the carriage after the manual operation of said lever whereby to shift the control member, another plunger mounted in said casing and projecting therefrom in spaced relation to the first plunger, and other connections between the plunger and lever and control member whereby either of said plungers when moved serves to shift the control member so that depression of the second plunger produces the opposite movement from that secured by depression of the first plunger, the second plunger being operable by movement of the carriage similarly as the first plunger.

15. In a mechanism of the character described, the combination with a single control member arranged to be shifted in either direction to control the speed and direction of travel of the carriage of a machine tool in rapid traverse and feed movements, of a control casing, a pair of laterally spaced substantially parallel plungers mounted in said casing and projecting therefrom, one of said plungers having connection with the control member to move the same, means providing a reversing connection between the plungers so that depression of the one plunger produces the opposite movement of the control member from that secured by depression of the other plunger, a manually operable control lever projecting from said casing and connected with the plungers to shift the same to a starting position, and means dependent upon movement of the carriage for depressing said plungers successively in a predetermined order after the manual operation of said lever.

16. A mechanism as set forth in claim 14 including a third spring actuated plunger arranged to be shifted with one of the first mentioned plungers or to shift the latter under spring action, said spring actuated plunger being shiftable in the movement of the manually operable lever to a certain position, latch means for releasably holding the spring actuated plunger in said position, and a dog actuated plunger associated with the latch means and arranged to release the latch means at a predetermined point in the movement of the carriage.

17. A mechanism as set forth in claim 15 including a third spring actuated plunger arranged to be shifted with one of the first mentioned plungers or to shift the latter under spring action, said spring actuated plunger being shiftable in the movement of the manually operable lever to a certain position, latch means for releasably holding the spring actuated plunger in said position, and a dog actuated plunger associated with the latch means and arranged to release the latch means at a predetermined point in the movement of the carriage.

18. A control unit for a hydraulically operated machine tool having a reciprocable carriage, said unit comprising a casing, a pair of plungers mounted for reciprocation in spaced parallel relation in said casing, means providing a reversing connection between said plungers whereby movement of one in one direction results in movement of the other in the opposite direction, manually operable means projecting from the casing and arranged to move said plungers to a starting relationship, the one plunger being arranged to be connected with a valve or the equivalent control element to be operated, a striker slidably mounted in the casing relative to an abutment provided on one of the plungers, spring means normally urging the striker toward said abutment, a latch arranged to hold the striker in a cocked position, said striker being arranged to be moved to cocked position by said abutment when said plunger is moved by hand to a certain position from a neutral position, and means for tripping said latch.

19. A control unit for a hydraulically operated machine tool having a reciprocable carriage, said unit comprising a casing, a pair of plungers mounted for reciprocation in spaced parallel relation in said casing, means providing a reversing connection between said plungers whereby movement of one in one direction results in movement of the other in the opposite direction, manually operable means projecting from the casing and arranged to move said plungers to a starting relationship, the one plunger being arranged to be connected with a valve or the equivalent control element to be operated, a striker slidably mounted in the casing relative to an abutment provided on one of the plungers, spring means normally urging the striker toward said abutment, latch means including a catch arranged to hold the striker in a cocked position, said striker being arranged to be moved to cocked position by said abutment when said plunger is moved by hand to a certain position from a neutral position, said latch means including another catch arranged to limit the movement of the parts when the first catch is released, and means for tripping said latch means.

20. In a control unit of the character described, the combination with a reciprocable machine tool carriage having dogs thereon, of a stationary casing, a pair of plungers mounted for reciprocation in and extending from said casing for depression by the dogs, means between the plungers providing a reversing connection therebetween whereby when one plunger is depressed the other is raised, and vice versa, a control member, an operating connection between one of said plungers and said control member whereby said member is moved in one direction by depression of the one plunger and is moved in the opposite direction by depression of the other plunger, and a manually operable member mounted on the outside of the casing and having a detachable operating connection with the connecting means between said plungers to communicate movement by hand to said plungers, the detachable connection permitting movement of the plungers independently of said manual member.

21. In a control unit of the character described, the combination with a reciprocable machine tool carriage having dogs thereon, of a stationary casing, a pair of plungers mounted for reciprocation in and extending from said casing for depression by the dogs, means between the plungers providing a reversing connection therebetween whereby when one plunger is depressed the other is raised, and vice versa, a control member, an operating connection between one of said plungers and said control member whereby said member is moved in one direction by depression of the one plunger and is moved in the opposite direction by depression of the other plunger, a sleeve slidably mounted on one of said plungers, spring means normally urging the same in one direction to move the plunger in that direction, means for releasably locking said sleeve in a cocked position, and means for releasing the last mentioned means.

22. A control unit as set forth in claim 21 wherein the last mentioned means comprises another plunger mounted for reciprocation in and extending from said casing for depression by a dog on the carriage.

23. Valve actuating mechanism for fluid pressure transmissions comprising a shiftable member adapted to be connected with the valve, impositive means for urging said member in one direction, a slidable plunger arranged adjacent said member, spring pressed latches carried by said plunger releasably engaging with said impositive means to restrain it in predetermined positions against moving said member, and another shiftable member having a reversing connection with the first shiftable member and valve, whereby the valve is moved in one direction by depression of the one shiftable member and is moved in the opposite direction by depression of the other shiftable member.

24. Valve actuating mechanism for fluid pressure transmissions comprising a shiftable member adapted to be connected with the valve, impositive means for urging said member in one direction, a slidable plunger arranged adjacent said member, spring pressed latches carried by said plunger releasably engaging with said impositive means to restrain it in predetermined positions against moving said member, another shiftable member having a reversing connection with the first shiftable member and valve, whereby the valve is moved in one direction by depression of the one shiftable member and is moved in the opposite direction by depression of the other shiftable member, and a manually shiftable member connected with the aforesaid shiftable members to communicate movement thereto manually to a selected position.

25. Valve actuating mechanism for fluid pressure transmissions comprising a shiftable member adapted to be connected with the valve, impositive means for urging said member in one direction, a slidable plunger arranged adjacent said member, spring pressed latches carried by said plunger releasably engaging with said impositive means to restrain it in predetermined positions against moving said member, and a manually shiftable member having connection with the aforesaid shiftable member to move the same in the other direction against the action of the impositive means.

RAYMOND A. CARLSON.